(12) United States Patent
Stone et al.

(10) Patent No.: US 6,423,291 B1
(45) Date of Patent: Jul. 23, 2002

(54) TITANIUM TETRACHLORIDE PRODUCTION

(76) Inventors: Andrew Kenneth Stone, 31 Riverpark Village Wilgeboom Street, Boskruin, Randburg, Gauteng Province; David Steyn Van Vuuren, 274 Albert Street, Waterkloof, Pretoria, Gauteng Province; Kevin Frans Pieter Cilliers, 8 Glen Alcade 108 Alcade Road, Lynnwood Glen, Pretoria, Gauteng Province, all of (ZA)

(*) Notice: Subject to any disclaimer, the term of this patent is extended or adjusted under 35 U.S.C. 154(b) by 0 days.

(21) Appl. No.: 09/636,400

(22) Filed: Aug. 10, 2000

(30) Foreign Application Priority Data

Aug. 13, 1999 (ZA) .............................. 99/5180

(51) Int. Cl.⁷ .............................. C01G 23/02
(52) U.S. Cl. .................. 423/492; 423/76; 423/78; 423/79; 423/82
(58) Field of Search .................. 423/492, 491, 423/82, 69, 76, 79, 78

(56) References Cited

U.S. PATENT DOCUMENTS

| | | | | |
|---|---|---|---|---|
| 3,760,071 A | * | 9/1973 | Brzozowski et al. | 423/492 |
| 3,899,569 A | | 8/1975 | Hunter et al. | 423/76 |
| 4,046,853 A | * | 9/1977 | Robinson | 423/79 |
| 4,070,252 A | * | 1/1978 | Bonsack | 423/492 |
| 4,128,409 A | * | 12/1978 | Bennett | 62/617 |
| 4,396,593 A | * | 8/1983 | Smidt et al. | 423/494 |
| 4,442,075 A | | 4/1984 | Rado | 423/76 |
| 4,460,550 A | * | 7/1984 | Rado | 423/79 |
| 4,521,385 A | | 6/1985 | Brandstatter | 423/76 |
| 5,224,986 A | | 7/1993 | Mostert et al. | 75/586 |
| 6,001,323 A | * | 12/1999 | Benninger | 423/494 |

FOREIGN PATENT DOCUMENTS

| | | |
|---|---|---|
| GB | 793151 | 3/1958 |
| JP | 51/116198 | * 10/1976 |

OTHER PUBLICATIONS

Ullmann's Encyclopedia of Industrial Chemistry 5$^{th}$ Edition, Eds. Elvers et al., A20:271–290, (no date).
Yamamoto, "Manufacture of titanium tetrachloride retrieved from STN," Database Chemabs 'Online!', Chemical Abstracts Service, XP002151219, 1993, (no month).

* cited by examiner

Primary Examiner—Ngoc-Yen Nguyen
(74) Attorney, Agent, or Firm—Fulbright & Jaworski LLP

(57) ABSTRACT

The invention provides a process for the production of titanium tetrachloride (TiCl$_4$) by the chlorination of titanium values in a titanium-containing starting material. The process includes exposing the starting material to a chlorinating agent and contacting the starting material with an inert liquid while the starting material is exposed to the chlorinating agent. The inert liquid is at a temperature of 200–350° C. and is at a pressure of 5–100 atmospheres (1 atmosphere= 101.325 kN/m$^2$). This causes the starting material to react with the chlorinating agent to form TiCl$_4$. The invention also extends to TiCl$_4$ whenever made in accordance with the method.

13 Claims, 2 Drawing Sheets

TITANIUM TETRACHLORIDE PRODUCTION

Figure 1:
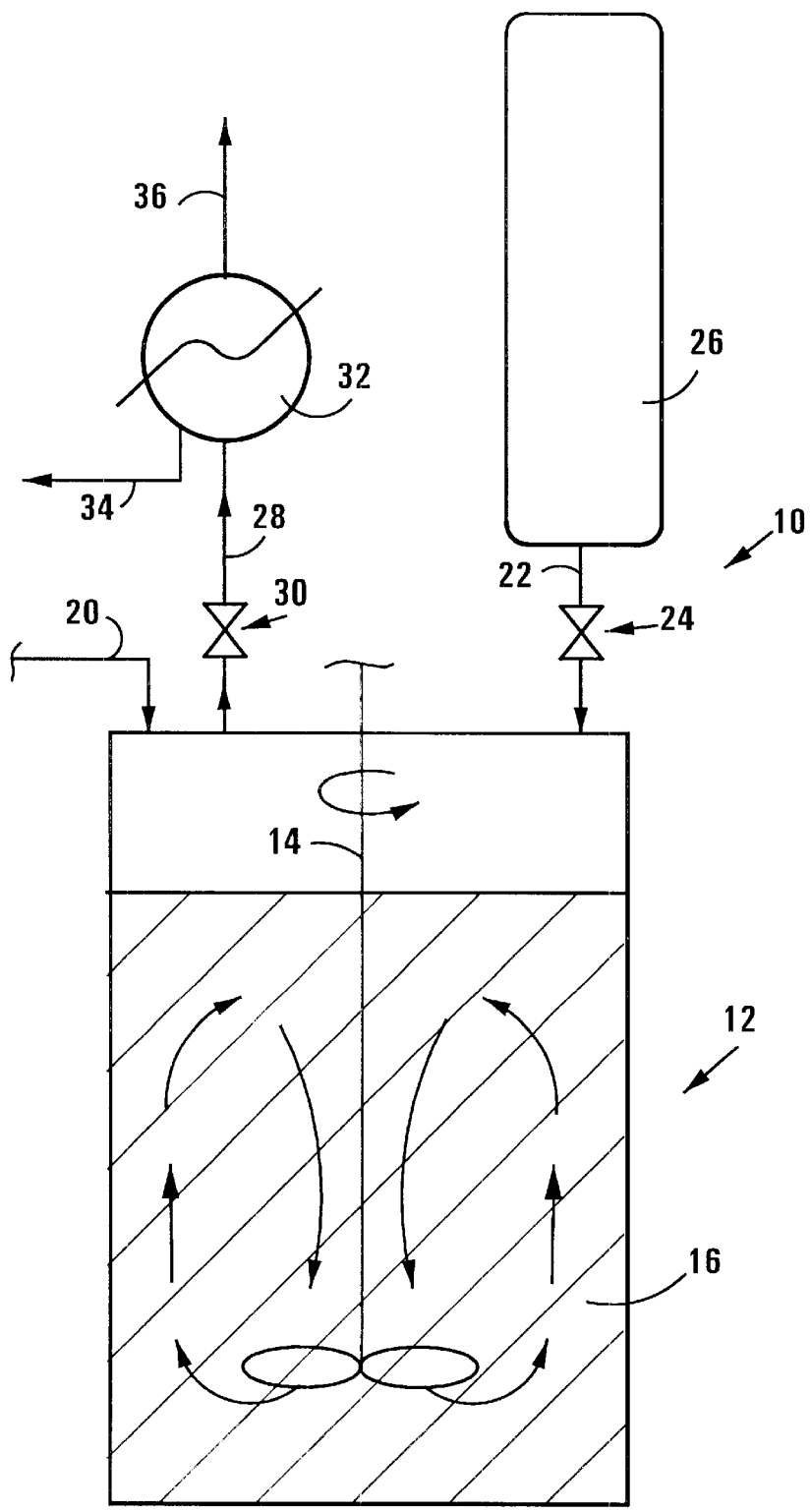

This invention relates to the production of titanium tetrachloride, namely $TiCl_4$. More particularly, the invention relates to a process for the production of $TiCl_4$, which is useful in the production of titanium metal or titanium dioxide, by the chlorination of titanium values in a titanium-containing starting material.

According to the invention there is provided a process for the production of titanium tetrachloride ($TiCl_4$) by the chlorination of titanium values in a titanium-containing starting material, the process including the steps of:

exposing the starting material to a chlorinating agent; and contacting the starting material with an inert liquid, while the starting material is exposed to the chlorinating agent, the inert liquid being at a temperature of 200–350° C. and being at a pressure of 5–100 atmospheres (1 atmosphere=101.325 $kN/m^2$), to cause the starting material to react with the chlorinating agent to form $TiCl_4$.

Preferably the temperature is 225–300° C., eg 230–290° C. and the pressure is preferably 6–50 atmospheres, eg 10–50 atmospheres. Contacting the starting material with the inert liquid may be by immersing the starting material in the inert liquid.

The starting material may be in the particulate solid form, preferably finely divided solid form, with a particle size of less than 3000μm, preferably less than 100μm, the starting material having an average particle size of 1–3000μm, preferably 50–100μm. The process may accordingly include, as a preliminary step, size reduction of the solid starting material, for example by milling, to achieve the above maximum and average particle sizes. Immersing the particulate starting material may thus be by suspending particles thereof in the inert liquid, conveniently to form a slurry, for example a slurry in which the suspended particles form 2–50% by volume, preferably 10–30%. In other words, contacting the starting material with the inert liquid may be by immersing it as a suspension in the inert liquid to form a slurry, suspended particles of the starting material in the slurry forming 2–50% by volume of the slurry.

Suitable starting materials may include carbides of titanium, nitrides of titanium, carbonitrides of titanium, titanium monoxide (TiO), oxycarbonitrides of titanium (particularly those wherein the predominant titanium-containing crystals are in the cubic phase, such as $Ti(O_x, C_y, N_z)$ in which $x+y+z=1$, and mixtures of the aforegoing.

By an inert liquid is meant a liquid which reacts unacceptably neither with the starting material nor with any chlorinating agent or reductant in the reaction mixture at the reaction temperature and reaction pressure. The inert liquid may thus be a fully chlorinated liquid substrate, which is not prone to being further chlorinated, examples being $SiCl_4$, $VCl_4$, $VOCl_3$, and in particular, $TiCl_4$ itself, so that the inert liquid may be selected from the group consisting of $SiCl_4$, $VCl_4$, $VOCl_3$, $TiCl_4$ and mixtures thereof.

The chlorinating agent may be a suitable chlorine-containing compound, such as a chlorine-containing liquid or particularly a chlorine-containing gas. Examples of suitable chlorinating agents are HCl, $CCl_4$, $SCl_2$, and, in particular, molecular chlorine gas, namely $Cl_2$. The chlorinating agent may thus be selected from the group consisting of HCl, $CCl_4$, $SCl_2$, $Cl_2$ and mixtures thereof. The chlorinating agent may be dispersed in the inert liquid, eg TiN, by dissolving it and/or dispersing globules or bubbles thereof in the inert liquid, conveniently under stirred and preferably turbulent conditions, to promote thorough mixing of the reaction mixture and contact between its reactive constituents, particularly between the starting material and the chlorinating agent. In other words, the chlorinating agent may be dispersed as a disperse phase in the inert liquid which forms a continuous phase, the inert liquid being agitated to promote dispersion of the chlorinating agent therein; and the agitation may be such as to produce turbulent conditions in the inert liquid to promote maintenance of homogeneous reaction mixture and rapid reaction between the starting material and the chlorinating agent.

The process may be carried out batchwise, or it may be carried out on a continuous basis.

When the process is carried out batchwise, it may be carried out in a reactor such as a temperature-controlled pressure vessel which is stirred or otherwise agitated, the pressure vessel containing a charge of inert liquid such as $TiCl_4$ and a charge of milled starting material having a maximum particle size of 100 μm and an average particle size of 50–100 μm, in which charge the starting material forms 10–30% by volume. The slurry may be heated to a temperature of at least 200° C., molecular chlorine liquid or gas then being admitted to the pressure vessel until an operating pressure of 10–50 atmospheres is reached. The chlorine will act strongly exothermically with titanium values in the starting material, to produce $TiCl_4$. $TiCl_4$ in the vessel is permitted to boil at an operating temperature corresponding to the operating pressure, being vented as a constituent of a vapour from the pressure vessel to prevent the temperature and pressure in the vessel from exceeding the operating temperature and operating pressure respectively. Thus, in a particular embodiment, the process may be carried out batchwise in a pressure vessel in which the temperature and pressure are controlled and in which the inert liquid is agitated, the inert liquid being $TiCl_4$, the starting material being a milled starting material having a maximum particle size of 100 μm and an average particle size of 50–100 μm and the starting material and inert liquid being present in a volume ratio of 10:90–30:70, the temperature being 225–300° C. and the pressure being 6–50 atmospheres, and the chlorinating agent being molecular chlorine ($Cl_2$), $TiCl_4$ in the vessel being permitted to boil and being vented from the vessel, as it is produced, as a constituent of a vapour vented from the vessel, the venting being at a rate which keeps the temperature at a value of 225–300° C. and keeps the pressure at 6–50 atmospheres.

The $TiCl_4$ in the vented vapour can be regarded as product and can be condensed and separated from other constituents of the vented vapour, such as chlorine gas and other gases or vapours, the chlorine optionally being recovered for subsequent use in chlorinating another batch of starting material. Solid residues will remain in the pressure vessel, typically suspended in the inert liquid. The aforesaid batch reaction cycle can then be repeated, by loading a fresh charge of starting material into the vessel and chlorinating it as set forth above. Accumulated solid residues can be cleared periodically from the vessel; and the charge of inert liquid can be discarded and replaced, if and when it becomes unacceptably contaminated by dissolved or suspended impurities.

When the process is carried out continuously, a starting material such as titanium nitride, milled to a maximum particle size of 100 μm and an average particle size of 50–100 μm and mixed with an inert liquid such as $TiCl_4$ to form a slurry in which the solid material forms 10–30% by volume. The slurry may then be heated to a temperature of at least 200° C. as for batch operation and transferred, eg by pumping, to a suitable reactor operating at at least 200° C. such as a temperature-controlled pressure vessel which is agitated, for example an upflow slurry bubble-column reactor which may be fitted with baffles to resist back mixing and to the bottom of which liquid or gaseous molecular chlorine is introduced as chlorinating agent, eg via a sparger. As is the case with batchwise operation, the introduced chlorine reacts with titanium values, in strongly exothermic fashion, to produce $TiCl_4$. Thus, in another particular embodiment, the process may be carried out continuously, milled starting material of a maximum particle size of 100 $\mu$m and average particle size of 50–100 $\mu$m being mixed with $TiCl_4$ as the inert liquid to form a slurry, the starting material and inert liquid being present in the slurry in a volume ratio of 10:90–30:70, the slurry being transferred at a temperature of at least 200° C. to a temperature-controlled pressure vessel into which molecular chlorine is introduced as the chlorinating agent, $TiCl_4$ being vented from the vessel, as it is produced, as a constituent of a vapour vented from the vessel, the venting being at a rate which keeps the temperature in the vessel at a value of 225–300° C. and the pressure at 6–50 atmospheres.

$TiCl_4$ and/or the inert liquid may be vented from the top of the column as part of a vapour, at a rate which controls the operating temperature in the column to a value of 225–300° C., the $TiCl_4$ and/or inert liquid being allowed to boil at an operating pressure of 6–50 atmospheres, corresponding to the operating temperature, bearing in mind that slurry feed is being introduced to the bottom of the reactor and spent slurry is being withdrawn from the top of the reactor. Gas vented from the reactor may have the $TiCl_4$ therein condensed as product, some of which may be recycled to the reactor, directly into the slurry feed, directly into the reactor or indirectly via the mixing step where the slurry feed is formed. Similarly, the inert liquid (if a substance other than $TiCl_4$ is used therefor)may be condensed and recycled to the reactor. Non-condensible gases from this condensation may, after extraction of any residual $TiCl_4$ or chlorine gas therefrom, be discarded, the extracted $TiCl_4$ and chlorine optionally being recycled to the reactor.

The spent slurry withdrawn from the top of the reactor may have the $TiCl_4$ contained therein recovered, eg by filtration, the filtrate being $TiCl_4$ which may be recycled to the initial slurry-forming mixing step, or to the slurry formed in the initial mixing step. Filter cake from the filtration step may then be dried, dried filter cake being subjected to waste treatment, eg to recover or neutralize salts such as $FeCl_2$ or $FeCl_3$ therein, before being discarded, and $TiCl_4$ from the drying may be recovered and recycled together with the recycled filtrate.

A feature of the process, whether carried out continuously or batchwise, is that, at the relatively low operating temperatures of 200–350° C., impurities such as silicates and aluminates are not chlorinated to any significant extent. Furthermore, in each case, a proportion of the introduced chlorine will dissolve in the $TiCl_4$ in the reactor, the remainder existing as bubbles. Any metallic iron will tend to be chlorinated to either ferrous chloride or ferric chloride, ie $FeCl_2$ or $FeCl_3$, which have relatively low vapour pressures at the reaction temperatures of 200–350° C., particularly if the reaction temperature is below 290° C. Relatively little $FeCl_2$ and $FeCl_3$ will thus issue from the reaction as vapour with the product $TiCl_4$ vapour, and the bulk thereof will remain dissolved in the $TiCl_4$ of the slurry where it forms a saturated solution, or will form a solid constituent attached to solids in the slurry, issuing from the reactor as part of the solids residue, on which it can form a passivating layer.

The invention extends to titanium tetrachloride whenever produced according to the method described above.

Figure 2:
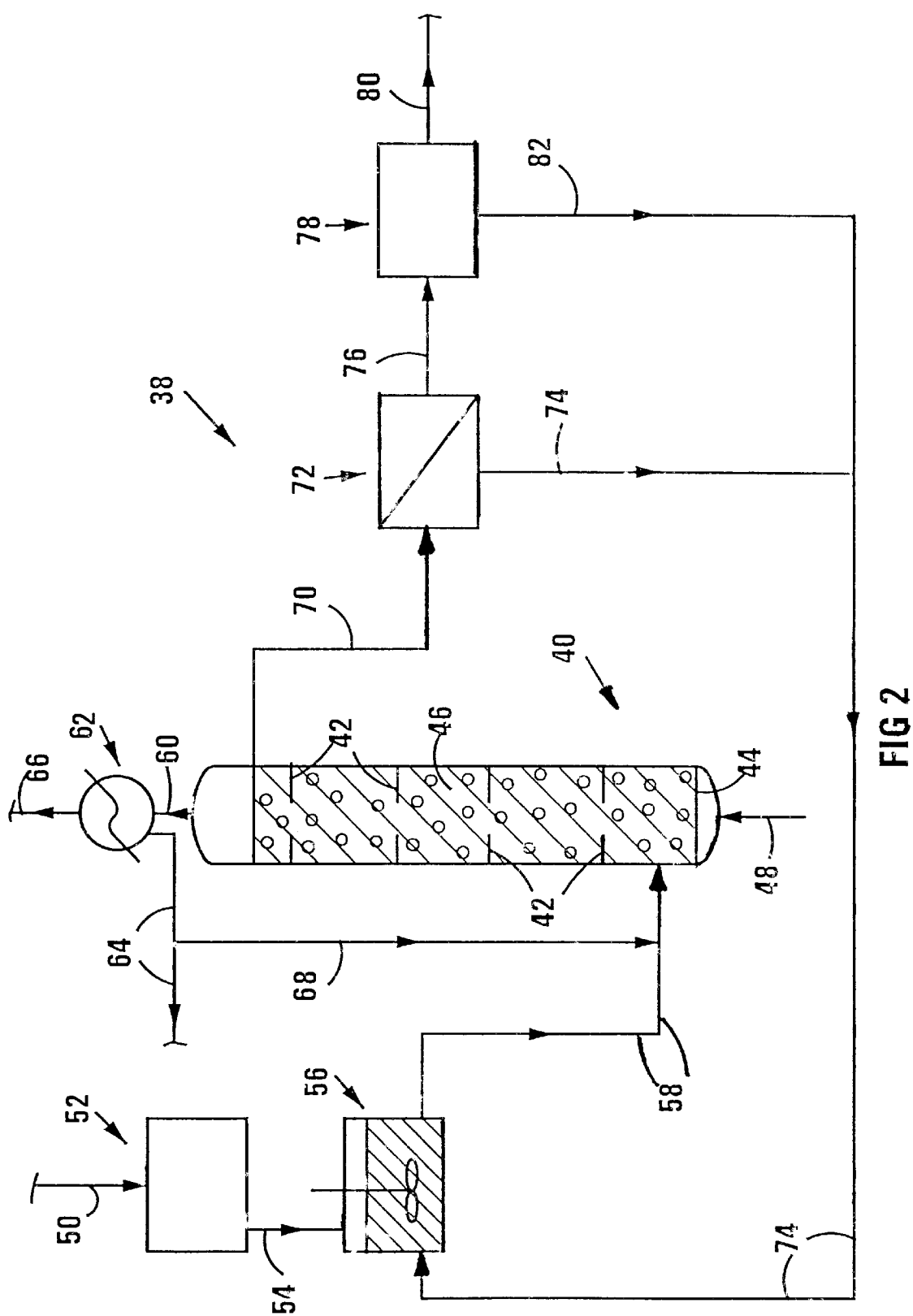

The invention will now be described, by way of a non-limiting illustrative example, with reference to the accompanying diagrammatic drawings, in which:

FIG. 1 shows a schematic flow diagram of a batchwise process according to the present invention; and FIG. 2 shows a schematic flow diagram of a proposed continuous process according to the present invention.

Referring first to FIG. 1 of the drawings, reference numeral 10 generally designates a flow diagram of a batchwise process according to the invention. In the flow diagram 10 is shown a reactor in the form of a pressure vessel 12 which is provided with a stirrer 14 and in which is shown a charge of slurry 16.

A feed line 20 is shown feeding into the top of the vessel 12, together with a chlorine feed line 22, provided with a valve 24 and leading from a chlorine supply 26. A product withdrawal line 28 provided with a valve 30 is shown issuing from the top of the vessel 12 and leading to a condenser 32 provided with a liquid condensate outlet line 34 and a gas outlet line 36.

A batchwise process according to the invention is carried out in terms of flow diagram 10 by loading a charge of $TiCl_4$ into the vessel 12 as shown, eg via the feed line 20 in the form of a slurry containing a charge of finely divided solid material such as a reduced titaniferous slag containing titanium nitride as TiN. In the example illustrated by FIG. 1, the solids will have been milled to a particle size of less than 100 $\mu$m and to an average particle size of 75 $\mu$m and will form 26% by volume of the slurry, and the slurry will be heated to 200° C.

Chlorine under pressure is then admitted from the supply 26 via the line 22 into the freeboard above the slurry 16 in the vessel 12, the valve 24 being open and the valve 30, together with a valve (not shown) in the line 20, both closed, until an operating pressure between 10 and 40 atmospheres and corresponding to a $TiCl_4$ boiling point (operating temperature) of 265° C., is reached. The valve 30, which will be a pressure relief outlet valve, will be set to open at this pressure .

Agitation of the slurry 16 by the stirrer 14 as shown by the arrows in the slurry will draw chlorine gas from the freeboard above the slurry 16 into the slurry as bubbles and some of it will dissolve in the slurry. This chlorine in the slurry will react with titanium in the starting material to form $TiCl_4$ with the strong production of heat. The temperature of the slurry will rise until a temperature of 265° C. is reached, whereupon the valve 30 will open and $TiCl_4$ will boil off the slurry as a vapour which passes along line 28 to the condenser 32 where it is condensed to form liquid $TiCl_4$ product which issues along line 34, optionally to further, conventional, purification. Non-condensible gases such as $CO_2$ or CO passing into the condenser 32 from line 28 with the $TiCl_4$ will issue from the condenser along line 36 to a further, conventional, extraction, where residual $TiCl_4$ and chlorine are extracted therefrom and are optionally recycled to the vessel 12 (this recycling is not shown), the non-condensible gases then being vented to waste after scrubbing and/or flaring, if appropriate.

The amount of chlorine admitted to the reactor 12 will be selected to match the amount of the titanium in the batch of starting material used, with a suitable stoichiometric excess, if necessary, determined by routine experimentation. On completion of the chlorination reaction, the $TiCl_4$ product in the reactor 12 is boiled off by opening the valve 30 to release the pressure in the reactor 12 and reduce it to atmospheric, while maintaining an elevated temperature in the reactor 12 above the boiling point of $TiCl_4$. A dry solid residue will remain in the reactor 12. Further batches of starting material can be chlorinated in the reactor by repeating the above operating cycle, the solid residue remaining in the reactor being removed from time to time, when necessary.

Turning to FIG. 2 of the drawings, reference numeral 38 generally designates a flow diagram of a continuous process according to the invention. In the flow diagram 38 is shown a reactor in the form of a slurry bubble-column reactor 40 provided with baffles 42 spaced over its height, and with a sparger 44 at its lower end or bottom. The reactor 40 is shown containing slurry 46 and is shown with a chlorine feed line 48 leading to the sparger 44.

Upstream of the reactor 40 a starting material solids feed line 50 is shown feeding to a milling stage 52 which in turn feeds along line 54 to a mixing stage in the form of a heated stirred tank 56. Flow line 58 leads from the tank 56 to the bottom of the reactor 40, immediately above the sparger 44.

A product withdrawal line 60 leads from the top of the reactor 40 to a condenser 62 provided with a liquid condensate outlet line 64, and a gas outlet line 66. A branch line 66 branches from line 64 and feeds into line 58.

Below a freeboard at the top of the reactor 40 a slurry overflow line 70 issues from the reactor 40 and leads to a filter 72 having a filtrate outlet flow line 74 and a filter cake outlet flow line 76. The line 76 leads to a drying stage 78 having a dried solids outlet line 80 and a liquid $TiCl_4$ outlet line 82. Line 82 feeds into line 74 and line 74 in turn feeds into tank 56.

A continuous process according to the invention is proposed in terms of flow diagram 38 involving feeding starting material, for example 20 a reduced titaniferous slag-containing titanium nitride, ie TiN, along line 50 to milling stage 52 where the solid starting material is milled to a maximum particle size of 100 $\mu$m and an average particle size of 75 $\mu$m. Milled solid is fed along line 54 to tank 56 where it is mixed with $TiCl_4$ from line 74 to form a slurry having solids content of 26% by volume. Slurry in the tank will be heated initially to 200° C. and fed at 200° C. into the reactor 40 along line 58 from the tank 56, to fill the reactor 40 up to the level of the overflow line 70. Chlorine will then be fed, as liquid or gas, into the reactor 40 via sparger 44 from line 48. Chlorine will be present in the slurry 46 of reactor 40 in the form of bubbles, as shown, and some of it will dissolve in the $TiCl_4$ of the slurry 46.

Chlorine in the slurry 46 reacts with titanium in the starting material in the slurry in strongly exothermic fashion, to form $TiCl_4$. Pressure is controlled in the reactor to a value between 10 and 50 atmospheres at which $TiCl_4$ in the slurry boils at 265° C. The temperature in the reactor 40 thus increases at start-up from 200° C. until 265° C. is reached, at which stage $TiCl_4$ boils off the top of the slurry 46 into the freeboard, from which $TiCl_4$ vapour issues along line 60 to condenser 62. In condenser 62 it is condensed to liquid $TiCl_4$ product which issues along line 64, optionally to further, conventional, purification. Non-condensable gases entering the condenser 62 along line 60 will issue along line 66 where they are treated as described above for such gases issuing along line 36 in FIG. 1. A proportion of the $TiCl_4$ condensed in the condenser 62 is recycled along lines 68 and 58 to the bottom of the reactor 40.

Slurry containing reacted (spent) solids residue overflows from the reactor 40 along flow line 70 to the filter 72, where it is filtered. $TiCl_4$ filtrate from the filter 72 issues along flow line 74 to the tank 56 where it is used, together with starting material from line 54, to make up the slurry fed to the reactor 40 along line 58. In this regard, once the reactor has reached its operating temperature at which $TiCl_4$ in the slurry boils at 265° C., the initial heating of the slurry from the tank 56 to 200° C. can be discontinued, slurry thereafter being fed at ambient temperature from the tank 56 to the reactor 40.

Filter cake from the filter 72 is discharged along line 76 to the drying and condensing stage 78 where it is dried by the removal of $TiCl_4$ therefrom. $TiCl_4$ removed in the drying and condensing stage 78 from the solids in the filter cake is condensed and then fed along line 82 to line 74, and dried solids are fed from drying stage 78 along line 80 to further, conventional, processing, before being discarded to waste.

In practice routine experimentation can be used to match the chlorine feed rate with the starting material feed rate so that there is a sufficient stoichiometric excess of chlorine and a sufficient residence time in the reactor 40, to convert an economically acceptable proportion of the titanium in the starting material to $TiCl_4$, bearing in mind the suppression of back-mixing in the reactor 40 caused by the baffles 42. The pressure in the reactor will be controlled to obtain the desired boiling temperature of 265° C. in the reactor 40, and the proportion of $TiCl_4$ recycled along line 66 will be set at a value sufficient for slurry in an acceptably fluid state to overflow along line 70 from reactor 40. It is thus expected, as indicated above, that routine experimentation will be used to match the starting material and chlorine feed rates with reactor size, and to match the $TiCl_4$ recirculation rate along line 66 with a sufficiently low slurry viscosity in the line 70.

A feature of the invention, as illustrated in FIG. 2, is that evaporating $TiCl_4$ from the reactor 40 acts to withdraw heat, arising from the exothermic chlorination, from the reactor 40. This heat is then eliminated by the condenser 62. A further feature of the invention is the ability of the process successfully to chlorinate a large variety of starting materials at low temperatures. The Applicant does not understand this enhanced utility at low temperatures, but, without being bound by theory, believes that it may arise from the high pressure at which the process is carried out.

What is claimed is:

1. A process for the production of titanium tetrachloride ($TiCl_4$) by the chlorination of titanium values in a titanium-containing starting material, the process including the steps of:

exposing the starting material to a chlorinating agent; and
    contacting the starting material with an inert liquid, while the starting material is exposed to the chlorinating agent, wherein the inert liquid is at a temperature of 200–350° C. and is at a pressure of 5–100 atmospheres to cause the starting material to react with the chlorinating agent to form $TiCl_4$.

2. A process as claimed in claim 1, in which the temperature is 225–300° C.

3. A process as claimed in claim 2, in which the pressure is 6–50 atmospheres.

4. A process as claimed in claim 1, in which contacting the starting material with the inert liquid is by immersing the starting material in the inert liquid.

5. A process as claimed in claim 1, in which the starting material is in finely divided solid form, having a particle size of less than 3000 $\mu$m.

6. A process as claimed in claim 5, in which contacting the starting material with the inert liquid is by immersing it as a suspension in the inert liquid to form a slurry, suspended particles of the starting material in the slurry forming 2–50% by volume of the slurry.

7. A process as claimed in claim 1, in which the inert liquid is selected from the group consisting of $SiCl_4$, $VCl_4$, $VOCl_3$, $TiCl_4$ and mixtures thereof.

8. A process as claimed in claim 1, in which the chlorinating agent is selected from the group consisting of HCl, $CCl_4$, $SCl_2$, $Cl_2$ and mixtures thereof.

9. A process as claimed in claim 1, in which the chlorinating agent is dispersed as a disperse phase in the inert liquid which forms a continuous phase, and the inert liquid is agitated to promote dispersion of the chlorinating agent therein.

10. A process as claimed in claim 9, in which the agitation is such as to produce turbulent conditions in the inert liquid.

11. A process as claimed in claim 1, which is carried out batchwise in a pressure vessel in which the temperature and pressure are controlled and in which the inert liquid is agitated, wherein the inert liquid is $TiCl_4$, the starting material is a milled starting material having a maximum particle size of 100 $\mu$m and an average particle size of 50–100 $\mu$m and the starting material and inert liquid are present in a volume ratio of 10:90–30:70, the temperature is 225–300° C. and the pressure is 6–50 atmospheres, and the chlorinating agent is molecular chlorine ($Cl_2$), $TiCl_4$ in the vessel is permitted to boil and is vented from the vessel, as it is produced, as a constituent of a vapour vented from the vessel, wherein the venting is at a rate which keeps the temperature at a value of 225–300° C. and keeps the pressure at 6–50 atmospheres.

12. A process as claimed in claim 1, which is carried out continuously, wherein milled starting material of a maximum particle size of 100 $\mu$m and average particle size of 50–100 $\mu$m is mixed with $TiCl_4$ as the inert liquid to form a slurry, the starting material and inert liquid are present in the slurry in a volume ratio of 10:90–30:70, the slurry is transferred at a temperature of at least 200° C. to a temperature-controlled vessel into which molecular chlorine is introduced as the chlorinating agent, $TiCl_4$ is vented from the vessel, as it is produced, as a constituent of a vapour vented from the vessel, wherein the venting is at a rate which keeps the temperature in the vessel at a value of 225–300° C. and the pressure at 6–50 atmospheres.

13. A process as claimed in claim 1, in which the starting material is in finely divided solid form, having an average particle size of 1–3000 $\mu$m.

* * * * *

UNITED STATES PATENT AND TRADEMARK OFFICE
CERTIFICATE OF CORRECTION

PATENT NO. : 6,423,291 B1  Page 1 of 1
DATED : July 23, 2002
INVENTOR(S) : Andrew Kenneth Stone et al.

It is certified that error appears in the above-identified patent and that said Letters Patent is hereby corrected as shown below:

<u>Column 1,</u>
Line 65, please delete "TiN" and insert therefor -- $TiCl_4$ --.

Signed and Sealed this

Thirty-first Day of December, 2002

JAMES E. ROGAN
*Director of the United States Patent and Trademark Office*